June 18, 1957 C. B. JACKSON ET AL 2,796,329
PRODUCTION OF DIBORANE
Filed June 21, 1947
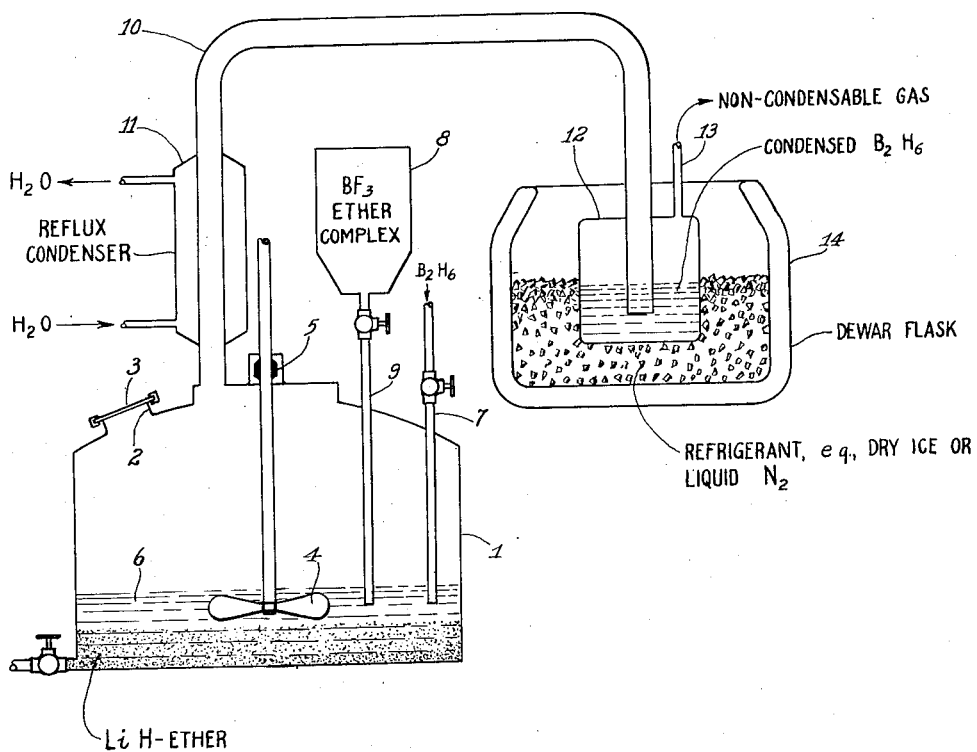
INVENTORS.
CAREY B. JACKSON
ROBERT M. BOVARD

United States Patent Office 2,796,329
Patented June 18, 1957

2,796,329

PRODUCTION OF DIBORANE

Carey B. Jackson, Forest Hills, and Robert M. Bovard, Mars, Pa., assignors, by mesne assignments, to Callery Chemical Company, Pittsburgh, Pa., a corporation of Pennsylvania Application June 21, 1947, Serial No. 756,282

1 Claim. (Cl. 23—204)

This invention relates to the production of diborane.

Diborane ($B_2H_6$) may be made in various ways. A classical, although roundabout, procedure involves the making first of magnesium boride which is then treated with acid to cause the evolution of a mixture of hydrides of boron from which by appropriate fractionation there may be separated dihydrotetraborane ($B_4H_{10}$). This latter material breaks down under heat to form chiefly diborane. This procedure is involved and roundabout, the yields are low, complex mixtures result that are extremely difficult to separate to obtain the pure compound, and it is time consuming and requires elaborate apparatus and unusually skilful technique. Another procedure is to subject a mixture of hydrogen and boron trichloride ($BCl_3$) to a high voltage discharge to form $B_2H_5Cl$ which decomposes to a mixture of diborane and boron trichloride. This method is subject to substantially the disadvantages just mentioned.

Still another mode of preparing diborane is to treat an alkali metal hydride, such as lithium hydride (LiH) with boron trifluoride ($BF_3$). This method is simpler than those just described, is more direct, and is productive of the desired material in substantially pure form. It would therefore be a more advantageous procedure were it not for the fact that as previously practiced it has been quite undependable. That is, although the reaction will occasionally start and run smoothly, in the great majority of cases it does not start for a substantial period of time, when it surges either violently enough to destroy the reaction vessel and associated apparatus or to cause contamination of the product.

The primary object of this invention is to provide a method of making diborane from alkali metal hydride, especially lithium hydride, in the practice of which the reaction starts promptly and proceeds smoothly, i. e., without an induction period and without surging, thereby overcoming the foregoing difficulties, and which is simple, reliable, easily practiced, efficient, and capable of practice with standard apparatus.

The invention will be described with reference to the accompanying drawing which is a schematic representation of apparatus for use in performance of our new method.

A higher proportion of hydrogen per molecular weight is available from lithium hydride than from the other alkali metal hydrides and the invention will therefore be described with particular reference thereto although only by way of example.

We have discovered, and it is upon this that the invention is in large part predicated, that its stated object is attained by first introducing diborane into contact with the lithium hydride, and promptly beginning the addition of boron trifluoride. We have found that in this way the reaction starts at once and proceeds smoothly, with no surges or related operating troubles, and that these results are attained consistently.

The lithium hydride must be very finely divided, and preferably it is suspended in ethyl ether. Other liquid suspending media that are inert insofar as they remain unaltered by and do not interfere with the reaction may be used.

The boron trifluoride may be used as such but, as is known, difficulties attend its use. Organic complexes of boron trifluoride are known that are more easily handled and are useable for the same purposes as the fluoride itself, and consequently we prefer them as the source of boron trifluoride. Boron trifluoride etherate gives particularly satisfactory results. The term "boron trifluoride reagent" as used in the claim applies both to the fluoride itself and to such organic complexes. Of course, complexes the organic portion of which react with the hydride or diborane should not be used.

For most purposes we prefer to introduce the diborane into the suspension of lithium hydride in ether at about 0° to 15° C. The boron trifluoride may be introduced also at the same time, but in any event it must be introduced promptly after the introduction of diborane has ceased. As soon as the reaction has started, the addition of diborane may be, and preferably is, discontinued, and thereafter the temperature of the reaction body is allowed to rise, when it is controlled to be at about the reflux temperature of the ether, i. e., about 35° C. The interval over which the diborane is introduced is immaterial, other things being equal, provided enough is introduced to cause the reaction to start upon the introduction of the boron trifluoride reagent. When the system is operated under atmospheric pressure, it suffices to introduce diborane for a few minutes only; where the system is operated under superatmospheric pressure satisfactory results are to be had by introducing diborane to bring the system up to the desired operating pressure, and then to discontinue its addition and immediately commence adding the boron fluoride reagent.

Having reference now to the drawing, a closed reactor 1 is provided with a feed opening 2 having a removable gas-tight cover 3, and provided also with means, not shown, for controlling the temperature of the contents. It is provided also with a stirrer 4 the shaft of which passes through a pressure-tight packing gland 5 to be driven externally in any suitable way, not shown. A charge 6 of finely powdered lithium hydride and ether is introduced through opening 2 and cover 3 is promptly fastened in place. The stirrer is started and diborane is passed into the suspension from any desired source, not shown, through a feed tube 7. The apparatus shown is operated under atmospheric pressure, and after the diborane has been introduced for a few moments boron trifluoride etherate from a storage container 8 is added through a feed tube 9, at which time the introduction of diborane may be, and preferably is, discontinued. The reaction starts promptly with evolution of diborane, and the gas is withdrawn through a tube 10 provided with a reflux condenser 11, or equivalent means for condensing and returning to the reactor the ether vapor that accompanies the diborane passing from the reactor. The diborane passes to a suitable condensing device 12 that is refrigerated to effect its condensation, and the uncondensed gas escapes to the atmosphere through a vent 13. The diborane may then be transferred to storage means, e. g., pressure bottles.

The particular means used for condensing the diborane will depend upon the pressure under which the system is operated. In operation at atmospheric pressure, e. g., in apparatus as exemplified by the drawings, this may be accomplished by liquid nitrogen contained in a Dewar flask 14. On the other hand, the system may with advantage be operated under pressure, in which case the gas may be condensed at higher temperatures. Thus, at 15 pounds gauge pressure Dry Ice or a Dry Ice-acetone mixture may be used for cooling the condenser 12, while it is practicable to condense at 0° C. when operating at about 400 pounds gauge pressure.

Although the invention has been described in detail with reference to the use of lithium hydride, other alkali metal hydrides, such as sodium hydride, may be used for the same purpose.

It appears probable that when the $B_2H_6$ is passed into the hydride-ether suspension it reacts with the hydride to form lithium borohydride ($LiBH_4$) which in turn reacts with $BF_3$ to form $B_2H_6$ so that the $B_2H_6$ introduced initially acts effectively as a catalyst to initiate the reaction, after which the $B_2H_6$ evolved continues itself to promote the reaction. Accordingly, instead of introducing diborane as described, the same result may be had by adding a small amount of $LiBH_4$ to the hydride-ether suspension, and this is, then, a mode of introducing diborane.

According to the provisions of the patent statutes, we have explained the principle of our invention and have illustrated and described what we now consider to represent its best embodiment. However, we desire to have it understood that, within the scope of the appended claim, the invention may be practiced otherwise than as specifically illustrated and described.

We claim:

The method of producing diborane which comprises adding boron trifluoride to lithium hydride in ether as a reaction medium and in the presence of an added small catalyzing amount of lithium borohydride, proceeding with the reaction at reaction temperatures, and recovering diborane in increased yield.

References Cited in the file of this patent

UNITED STATES PATENTS 2,553,198    Lesesne _____ May 15, 1951